(12) United States Patent
Doyle et al.

(10) Patent No.: US 12,312,260 B1
(45) Date of Patent: May 27, 2025

(54) CHLORINATOR WITH ONBOARD FLOW SENSOR

(71) Applicants: Kevin Doyle, Pompano Beach, FL (US); Rakesh Reddy, Boca Raton, FL (US)

(72) Inventors: Kevin Doyle, Pompano Beach, FL (US); Rakesh Reddy, Boca Raton, FL (US)

( * ) Notice: Subject to any disclaimer, the term of this patent is extended or adjusted under 35 U.S.C. 154(b) by 0 days.

(21) Appl. No.: 18/913,149

(22) Filed: Oct. 11, 2024

(51) Int. Cl.
*C02F 1/467* (2023.01)
*C02F 1/461* (2023.01)
*C02F 103/42* (2006.01)

(52) U.S. Cl.
CPC ........ *C02F 1/4674* (2013.01); *C02F 1/46109* (2013.01); *C02F 2103/42* (2013.01); *C02F 2201/46145* (2013.01); *C02F 2209/008* (2013.01); *C02F 2303/04* (2013.01)

(58) Field of Classification Search
CPC ...... C02F 1/46; C02F 1/32; C02F 1/42; C02F 1/30; C02F 1/72; C02F 1/34; C25B 1/26
See application file for complete search history.

(56) References Cited

U.S. PATENT DOCUMENTS

| | | | |
|---|---|---|---|
| 7,695,613 B2 | 4/2010 | Doyle et al. | |
| 10,155,679 B2 * | 12/2018 | Mastio | C25B 1/26 |
| 11,427,484 B1 * | 8/2022 | Reddy | C02F 1/46104 |
| 11,709,479 B1 * | 7/2023 | Reddy | C02F 1/008 700/282 |
| 2006/0169647 A1 * | 8/2006 | Doyle | C02F 1/4674 210/192 |
| 2007/0108056 A1 * | 5/2007 | Nyberg | B01D 61/54 204/554 |
| 2012/0158336 A1 * | 6/2012 | Duchamp | C02F 1/008 702/81 |
| 2013/0075329 A1 * | 3/2013 | Culler | C02F 1/006 137/544 |

FOREIGN PATENT DOCUMENTS

| | | | | |
|---|---|---|---|---|
| WO | WO-2007044609 A1 * | 4/2007 | | B01D 61/44 |
| WO | WO-2007092172 A2 * | 8/2007 | | C02F 1/4674 |
| WO | WO-2011004015 A2 * | 1/2011 | | C02F 1/008 |
| WO | WO-2020186162 A1 * | 9/2020 | | C02F 1/008 |

* cited by examiner

*Primary Examiner* — Renee Robinson
(74) *Attorney, Agent, or Firm* — Armon Shahdadi, Pierson Ferdinand LLP (57) ABSTRACT

A chlorinator device for generating chlorine in a body of water includes a housing with an inlet and outlet end, a flowrate sensor mounted within the housing to measure water flowrate, and an electrolyte plate mounted within the housing to contact flowing water and convert salt into chlorine. The device can include an external controller for processing flowrate information, obtaining information from a cloud platform or other external sources, and controlling chlorine production. Methods for operating the chlorinator device, including adjusting chlorine production based on flowrate and external factors, are also disclosed.

20 Claims, 7 Drawing Sheets

CHLORINATOR WITH ONBOARD FLOW SENSOR

BACKGROUND

Swimming pools and other bodies of water generally require proper water circulation and treatment to maintain water quality and safety. For example, circulation enables filtration, chemical treatment, heating, and cleaning of the water. Chlorination is a common method used to disinfect pool water and prevent the growth of harmful microorganisms.

Conventional chlorination systems for pools typically utilize chlorine tablets or liquid chlorine that must be manually added to the water on a regular basis. This manual approach can be inconvenient for pool owners and may lead to inconsistent chlorine levels if not performed diligently. Additionally, storing and handling chlorine chemicals can pose safety risks.

Some automated chlorination systems have been developed to address the drawbacks of manual chlorination. These systems often use salt chlorination, where salt is added to the pool water and electrolysis is used to generate chlorine. However, existing automated systems frequently have limitations. For example, many systems lack the ability to accurately measure and control chlorine production based on real-time pool conditions and usage.

Another challenge with conventional chlorination systems is the reliance on complex onboard electronics for control and monitoring functions. These onboard electronics can be expensive to repair or replace if they malfunction, oftentimes requiring replacement of the entire chlorinator device that houses the onboard electronics. The electronics may also be susceptible to damage from exposure to water and pool chemicals over time.

Additionally, most existing chlorination systems operate in isolation from other pool equipment and environmental factors. This can result in inefficient operation, as the chlorination system may not account for variables like weather conditions, swimmer load, or the performance of the filtration system when determining chlorine production levels.

Therefore, a problem exists with current pool chlorination systems with respect to their ability to efficiently and accurately maintain proper chlorine levels while minimizing maintenance requirements and costs. There is a need for improved chlorination systems that can overcome these limitations.

SUMMARY

Examples described herein include systems and methods for generating chlorine in a body of water. In one example, a chlorinator device for generating chlorine in a body of water is disclosed. The chlorinator device includes a housing having an inlet end and an outlet end, where the inlet and outlet ends are in communication with the body of water. The chlorinator device can further include at least one flowrate sensor mounted within the housing and positioned to measure the flowrate of water through the housing. Additionally, the chlorinator device can include at least one electrolyte plate mounted within the housing and positioned to contact water flowing through the housing, and the one or more electrolyte plates can be electrified such that they convert salt within the water into chlorine.

In some examples, the flowrate sensor includes a turbine that rotates based on water flowing through the turbine which causes the rotation. The flowrate sensor may utilize at least one Hall-effect sensor configured to determine a rotational speed of the turbine. The flowrate sensor may be configured to generate information sufficient to derive a current flowrate through the chlorinator device.

In an example, the chlorinator device further includes an external controller coupled to the housing via an electrical cable and configured to communicate with the at least one flowrate sensor. The external controller can receive flowrate information generated by flowrate sensor. The external controller can use that information to inform various decisions regarding the pool and proper treatment of the water. It can also be configured to perform an encrypted handshake procedure with an onboard controller of the chlorinator device, to ensure compatibility between devices.

The chlorinator device can be configured to calculate pool turnover based on tracking flowrate through the chlorinator device for a period of time, calculating a volume of water based on flowrate information for the period of time, and comparing the calculated volume to a known volume of the body of water. Additionally, the chlorinator device may be configured to receive weather information and generate instructions based on the weather information. The chlorinator device may be further configured to transmit the generated instructions to at least one different device in communication with the body of water.

In some examples, the chlorinator device may be configured to connect to a wireless network and upload information to a cloud storage location. Based on flowrate information from the at least one flowrate sensor, the chlorinator device may be configured to detect a change in performance in a filtration system of the body of water. For example, the chlorinator device can be configured to detect that the filtration system is blocked. As another example, it can be configured to generate an alert based on detecting the change in performance in the filtration system.

An example method for generating chlorine in a body of water is also disclosed. The method may involve providing a chlorine generator comprising a housing having an inlet end and an outlet end in communication with the body of water, at least one flowrate sensor mounted within the housing and positioned to measure a flowrate of water through the housing, and at least one electrolyte plate mounted within the housing and positioned to contact water flowing through the housing, where the at least one electrolyte plate may be electrified such that it converts salt within the water into chlorine.

Both the foregoing general description and the following detailed description are exemplary and explanatory only and are not restrictive of the examples, as claimed.

DETAILED DESCRIPTION

Reference will now be made in detail to the present examples, including examples illustrated in the accompanying drawings.

Disclosed herein are devices, systems, and methods directed to flow-based chlorination mechanisms and techniques. In one example, a chlorinator device is provided for generating chlorine in a body of water. The chlorinator includes a housing with an inlet and outlet end, a flowrate sensor mounted within the housing to measure water flowrate, and electrolyte plates mounted within the housing to contact flowing water and convert salt into chlorine. The device can include an external controller for processing flowrate information, obtaining information from a cloud platform or other external sources, and controlling chlorine production. Methods for operating the chlorinator device, including adjusting chlorine production based on flowrate and external factors, are also disclosed.

The term "pool" is used for convenience throughout this disclosure to refer to any body of water, including pools, spas, hot tubs, reservoirs, ponds, or any other body of water. Similarly, the term "water" is used to describe the liquid mixture that fills the body of water and is not intended to imply pure water. Along the same lines, the term "chlorine" refers to hypochlorous acid, sodium hypochlorite, or any other disinfectant. These terms are not intended to be limiting in any way.

Figure 1:
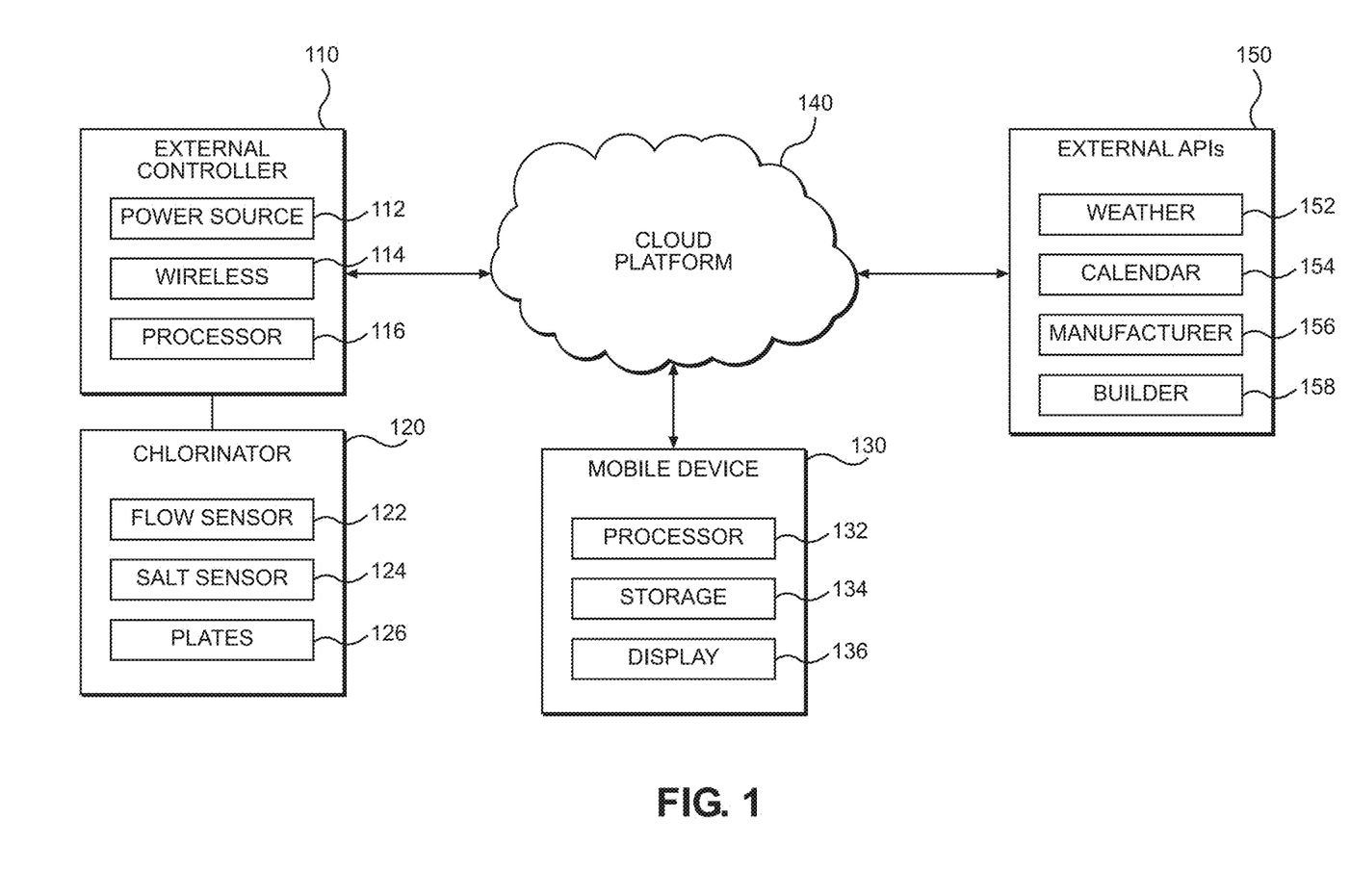
FIG. 1 is a system architecture diagram of an example chlorinator system.

FIG. 1 provides a system architecture diagram that includes a chlorinator device 120 with an external controller 110, which communicates with a cloud platform 140. The cloud platform 140 can also communicate with a mobile device 130, such as through a mobile application on the mobile device 130. It can also communicate with external Application Programming Interfaces ("APIs") that can provide various types of information. The cloud platform 140 can coordinate these various devices and sources of information to ensure optimal chlorination for a pool or other body of water.

The chlorinator device 120 of FIG. 1 includes a flow sensor 122, a salt sensor 124, and one or more electrolyte plates 126. The flow sensor 122 may be implemented in various ways to measure water flow through the chlorinator. For example, the flow sensor 122 can utilize a turbine, paddle wheel, ultrasonic sensor, or differential pressure sensor. In one implementation, the flow sensor 122 includes a turbine with blades that rotate as water flows through the sensor. The rotation speed of the turbine may be measured to determine the flow rate. For example, a Hall-effect sensor can measure the rotational speed to estimate rotations per minute. In another example, the flow sensor 122 can use ultrasonic transducers to measure the transit time of ultrasonic pulses through the water flow to calculate flow rate.

The flow sensor 122 can be positioned within the body of the chlorinator 120 such that all water passing through the chlorinator 120 also passes through the flow sensor 122 and is therefore measured. Additionally, the chlorinator 120 can be plumbed into the circulation system of the relevant pool such that all water circulating through the system passes through the chlorinator, and therefore the flow sensor 122. In this way, the flow sensor 122 can provide an accurate measurement of the circulation rate of the overall pool circulation system.

The chlorinator device 120 can also include a salt sensor 124 that measures the salinity or conductivity of the water passing through the chlorinator 120. Various types of salt sensors may be employed, such as inductive, conductive, or optical sensors. For instance, the salt sensor 124 may use a pair of electrodes to measure the electrical conductivity of the water, which correlates to salinity. Alternatively, the salt sensor 124 can use an optical refractometer to determine salinity based on the refractive index of the water. Measurements provided by the salt sensor 124 can be used to determine an optimal power level to be applied to the electrolyte plates 126, which interact with the salt to produce chlorine. A low salt concentration can lead to insufficient chlorine generation, for example, and require additional power to be applied to the electrolyte plates 126.

The electrolyte plates 126 can be implemented as a single plate, in one example, or as a series of parallel metal plates, for example titanium with a ruthenium oxide coating. The plates 126 can be arranged in various configurations within the chlorinator housing to maximize water contact. For example, the plates may be oriented vertically, horizontally, or at an angle. The spacing between plates and total surface area may be optimized for chlorine generation efficiency. In some implementations, the plates 126 may have a mesh or perforated design to increase surface area.

The system of FIG. 1 can also include an external controller 110 that can communicate with the chlorinator device 120 and provide various instructions as well as power for running the components within the chlorinator device 120. In some embodiments, the external controller 110 is a separate physical device from the chlorinator 120, connected by an electrical cable.

The external controller 110 can include a power source 112, wireless communication capabilities 114, and a hardware-based processor 116. It can also include memory storage. The external controller 110 can further include external indicators such as lights, a display, or a combination thereof. It can also include audio capabilities. Furthermore, the external controller 110 can include input mechanisms, such as a button or touchscreen, that allows a maintenance person to interact with the controller 110.

The external controller 110 can wirelessly communicate with a cloud platform 140. The cloud platform 140 may serve as a central hub for data storage, processing, and communication between various components of the system. The cloud platform 140 can be implemented in a server, or a group of servers such as in a distributed datacenter software-defined data center. In an example, the cloud platform 140 can provide updates and instructions to the external controller 110.

The system of FIG. 1 may also include a mobile device 130, which can be any type of computing device such as a phone, tablet, or laptop or desktop computer. The mobile device 130 can include a hardware-based processor 132, memory storage 134, and a display 136. It can be used to remotely monitor and control the chlorinator system.

The cloud platform 140 can interface with external APIs 150, such as by making API calls through a computing system. The APIs can provide various types of information, including weather information 152, calendar data 154, manufacturer information 156, and builder information 158. This integration allows the system to incorporate external data into its decision-making processes.

The weather API 152 can provide real-time and forecasted weather information that may be used to adjust chlorine production based on environmental factors. For example, higher temperatures or expected rainfall can trigger increased chlorine production. This determination can be made the cloud platform 140 in some examples. In other scenarios, the determination of how to incorporate weather information, or any other information pulled via API calls, can be performed by a mobile application executing on the mobile device 130.

The calendar API 154 can provide information about scheduled pool usage or maintenance, which may be used to optimize chlorine production and system operation. As an example, the calendar API 154 can connect to a user's calendar information, which is typically stored online in a capacity amenable to sharing with external endpoints. As an example, a user's calendar to be synced to the cloud platform 140 through the calendar API 154, and the cloud platform 140 can perform the necessary processing to determine when to expect heavier or lighter pool usage.

To provide a more specific example, a user can input into the mobile device 130 a calendar event indicating that they are having a party at their house. This information can be pulled by the cloud platform 140 using the appropriate API. If the weather is expected to be within an acceptable range during the party, the cloud platform 140 can determine that a higher than average number of people are likely to use the pool on the day of the party. For a period of time before the party, such as 12 or 24 hours, the cloud platform 140 can instruct the chlorinator 120 to boost chlorine production for that time period.

The manufacturer API 156 can provide access to manufacturer-specific information, updates, or support services. This can include firmware updates, troubleshooting guides, or performance optimization recommendations.

The builder API 158 can provide information relevant to the pool's construction, such as volume, surface area, or specific equipment details. This information can be used to fine-tune the chlorinator's operation for the specific pool configuration.

Although these sources of information are described as APIs, they can be any electronic transmission mechanism. Any type of request made by a server, and any type of response from the source of information back to the server, can be used in place of the API mechanisms described herein, to similar effect and result.

In some examples, the cloud platform 140 analyzes the data received from these various sources 150 to provide intelligent, adaptive control of the chlorinator system. For example, it may adjust chlorine production based on anticipated weather conditions, scheduled pool usage, and historical performance data.

In some embodiments, the mobile application executing on the mobile device 130 provides a user interface for monitoring and controlling the chlorinator 120 and other pool-related systems. The application can display various types of information and visual cues to the user via the display 136. The storage 134 in the mobile device 130 can store historical data about the system's performance, user preferences, and configuration settings. This data can be synchronized with the cloud platform 140 to ensure consistency across different access points and to provide backup. The application may display current system status, historical data, and allow the user to adjust settings or respond to alerts.

For example, the mobile application can generate and display warnings about filtration blockages detected by the chlorinator 120. These warnings may be based on flow rate data from the flow sensor 122, which can indicate reduced water flow through the chlorinator 120 compared to historical or expected values. The expected values can be determined by taking into account the current and historical speed of the pool pump in some examples.

The mobile application may also alert users to potential issues with pool pump performance. For instance, if the flow sensor 122 consistently detects lower-than-expected flow rates, the application can generate a warning suggesting that the pool pump may be weakening or requiring maintenance.

Additionally, the mobile application can display any other problems or anomalies identified by the chlorinator 120. These include issues related to salt levels (as detected by the salt sensor 124), water chemistry imbalances, or power supply irregularities, as examples.

The mobile application may also provide scheduling features that allow users to input information about planned pool usage. For instance, a user may indicate through the application that a large number of people will be using the pool on an upcoming weekend. Based on this information, the system may adjust the chlorinator 120 settings to increase chlorine production in preparation for the higher demand.

Conversely, if a user indicates through the application of the mobile device 130 that the pool will not be used for an extended period, the system may reduce chlorine production to conserve resources. These adjustments may be made by modifying the power level applied to the electrolyte plates 126 in the chlorinator 120.

In some embodiments, the mobile application can include a feature for monitoring and displaying pool water turnover rates. Pool turnover be calculated based on flow rate data from the flow sensor 122 and known pool volume information, such as information obtained via the builder API 158. The application can alert users if the turnover rate falls below recommended levels, which could indicate issues with the filtration system or pump. In one example, the recommended level is that a pool be fully turned over (i.e., the entire volume of the pool pumped through the filtration system) within 24 hours.

The mobile application may also provide a user interface for manually adjusting chlorinator settings, initiating cleaning cycles, or overriding automatic functions when desired. These controls can be particularly useful for pool maintenance professionals or experienced pool owners who wish to fine-tune the system's operation.

In some implementations, the mobile application includes a feature for tracking and displaying historical data related to pool chemistry, chlorine production, and system performance. This data can be stored in the storage 134 of the mobile device 130 or in the cloud platform 140, allowing users to review trends over time and make informed decisions about pool maintenance.

The mobile application can also integrate with the calendar API 154 to allow users to set recurring maintenance tasks or schedule pool service appointments. These calendar events can be set to trigger reminders or automatic system adjustments as appropriate.

In some embodiments, the mobile application may include a troubleshooting guide or virtual assistant feature. This feature can use data from the chlorinator 120 and other connected systems to diagnose potential issues and provide step-by-step guidance for resolving common problems.

The mobile application may also facilitate communication with pool service professionals. For example, it may include a feature for sending system data and diagnostic information directly to a service company, streamlining the process of diagnosing and resolving issues.

In some examples, the mobile application includes a feature for optimizing energy usage. This feature can analyze data from the chlorinator 120, pump performance, historical and scheduled pool usage information, and external factors like electricity rates and weather forecasts to suggest the most energy-efficient operating schedule for the pool system.

In some examples, the mobile application provides a feature for controlling other pool equipment, such as pumps, heaters, and lighting systems, all from a single interface. This integration can allow for more efficient pool management and energy use.

In some embodiments, the mobile application includes a troubleshooting guide to help users diagnose and resolve common pool problems. This guide can use data from the chlorinator 120 and other connected devices to provide targeted advice. The mobile application may also provide educational content about pool chemistry and maintenance, helping users to better understand and care for their pools.

In some examples, the mobile application includes a social sharing feature, allowing users to compare their pool's performance with friends or neighbors who also use the system. This feature can be used to gamify pool maintenance and encourage best practices and further investment into pool equipment and services.

Figure 2:
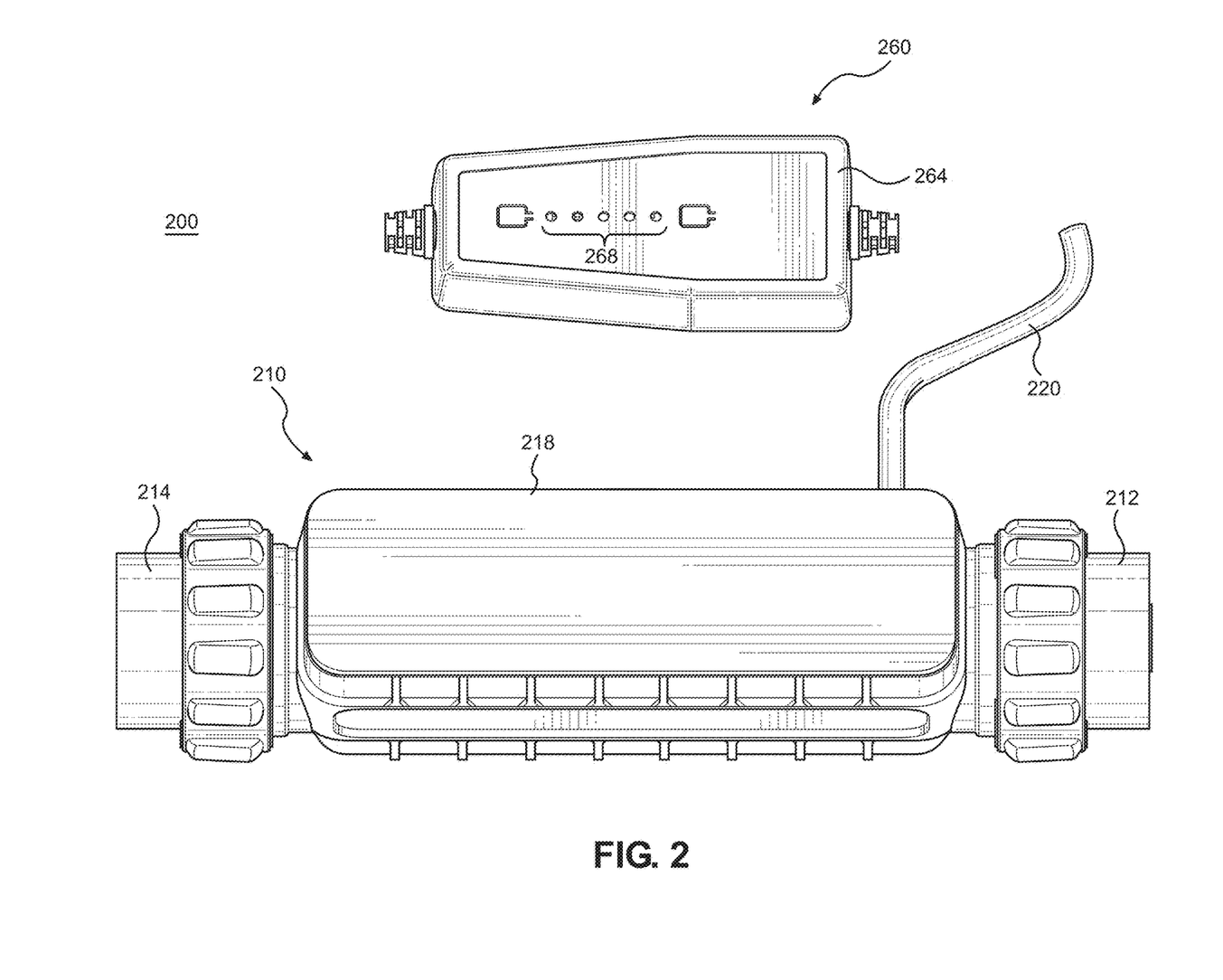
FIG. 2 is a perspective view of an example chlorinator device with external controller according to one or more embodiments herein.

FIG. 2 illustrates an example chlorinator system 200, including a chlorinator device 210 that can be used in the system shown in FIG. 1. For example, the chlorinator device 210 can correspond to the chlorinator 120 depicted in and described with respect to FIG. 1. The chlorinator device 210 includes a housing 218 with an inlet end 212 and an outlet end 214. The inlet end 212 and outlet end 214 can include end caps or fittings for connecting the chlorinator device 210 to plumbing of a pool circulation system.

An electrical cable 220 extends from the housing 218 and can be used to connect the chlorinator device 210 to an external controller 260, which can be the external controller 110 shown in FIG. 1. The electrical cable 220 can provide power to components within the chlorinator device 210 as well as enable communication between the chlorinator device 210 and the external controller 260.

The housing 218 can contain internal components of the chlorinator device 210, such as flow sensors, salt sensors, and electrolyte plates as described in relation to FIG. 1 and as shown in more detail in other Figures and described in more detail below. These internal components are not visible in the external view of FIG. 2.

FIG. 2 also shows an example external controller 260 that can be used to control and communicate with the chlorinator device 210. The external controller 260 includes a housing 264 for protecting the various components within. It also includes input mechanisms 268, such as buttons or a touchscreen, to allow a user to interact with and control the system. In some examples, element 268 corresponds to a one or more lights than can be used to indicate the current state of the system.

The external controller 260 can be mounted separately from the chlorinator device 210, such as on a wall near the pool equipment. It communicates with and provides power to the chlorinator device 210 via the electrical connector 220. This separate controller configuration allows for convenient user access while keeping the chlorinator device itself installed inline with the pool plumbing. Furthermore, the external controller configuration separates the power supply, which generates substantial heat, from the chlorinator device 210. This allows the chlorinator device 210 to have a simpler design than devices having onboard electronics. It also allows for modular replacement of different parts of the system 200.

Figure 3:
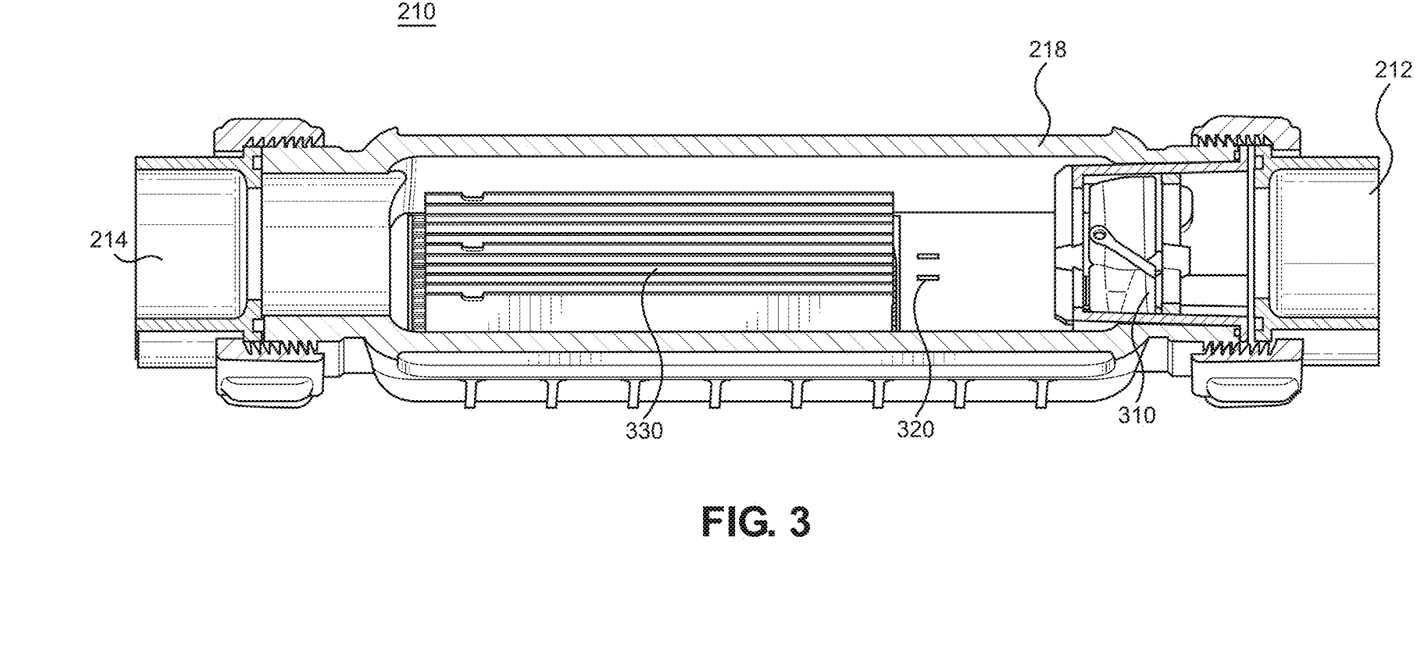
FIG. 3 is a perspective, cross-sectional view of the example chlorinator device of FIG. 2.

FIG. 3 illustrates a cross-sectional view of the example chlorinator device 210 of FIG. 2, which can also be used in the system shown in FIG. 1. The chlorinator device 210 shows a cross section through the housing 218. Within the housing 218, the chlorinator device 210 contains several internal components.

A flow sensor 310 is mounted within the housing 218 near the inlet end 212. The flow sensor 310 can alternatively be mounted near the outlet end 214, or elsewhere in the housing 218. In some examples, multiple flow sensors are utilized, such as by having one in each of the inlet and outlet ends 212, 214. The flow sensor 310 can be positioned to measure the flowrate of water as it enters and passes through the chlorinator device 210. In some examples, the flow sensor 310 can include a turbine with blades that rotate as water flows through it. The rotation speed of the turbine can be measured to determine the flowrate, such as by using a Hall-effect sensor to estimate rotations per minute. Other types of flow sensors may also be used, such as ultrasonic sensors or differential pressure sensors.

A salt sensor 320 can be mounted within the housing 218 downstream from the flow sensor 310. The salt sensor 320 can be configured to measure the salinity or conductivity of the water passing through the chlorinator device 210. Various types of salt sensors may be employed, such as inductive, conductive, or optical sensors. For instance, the salt sensor 320 may use a pair of electrodes to measure the electrical conductivity of the water, which correlates to salinity. Alternatively, the salt sensor 320 can use an optical refractometer to determine salinity based on the refractive index of the water. The salt sensor 320 can generate an electrical signal that is sent to an onboard controller (not shown) and then to the external controller 260 (shown in FIG. 2).

One or more electrolyte plates 330 can be mounted within the housing 218, in this example downstream from the salt sensor 320. The electrolyte plates 330 can be positioned to contact water flowing through the housing 218. In some examples, the electrolyte plates 330 can be implemented as a series of parallel metal plates, for example titanium with a ruthenium oxide coating. The plates 330 can be arranged in various configurations within the chlorinator housing to maximize water contact. For example, the plates may be oriented vertically, horizontally, or at an angle. The spacing between plates and total surface area may be optimized for chlorine generation efficiency.

When electrified, the electrolyte plates 330 can convert salt within the water into chlorine through electrolysis. The power level applied to the electrolyte plates 330 can be adjusted to control the rate of chlorine production based on various factors such as flowrate, salinity, and chlorine demand. Examples of scenarios where control over the rate of chlorine production are described in detail with respect to FIG. 1 above.

The internal components of the chlorinator device 210 can be connected to external control and power systems via an electrical cable (not shown in this figure), such as element 220 of FIG. 2, that extends from the housing 218. This allows for communication of sensor data and control of the electrolyte plates from an external controller.

Figure 4:
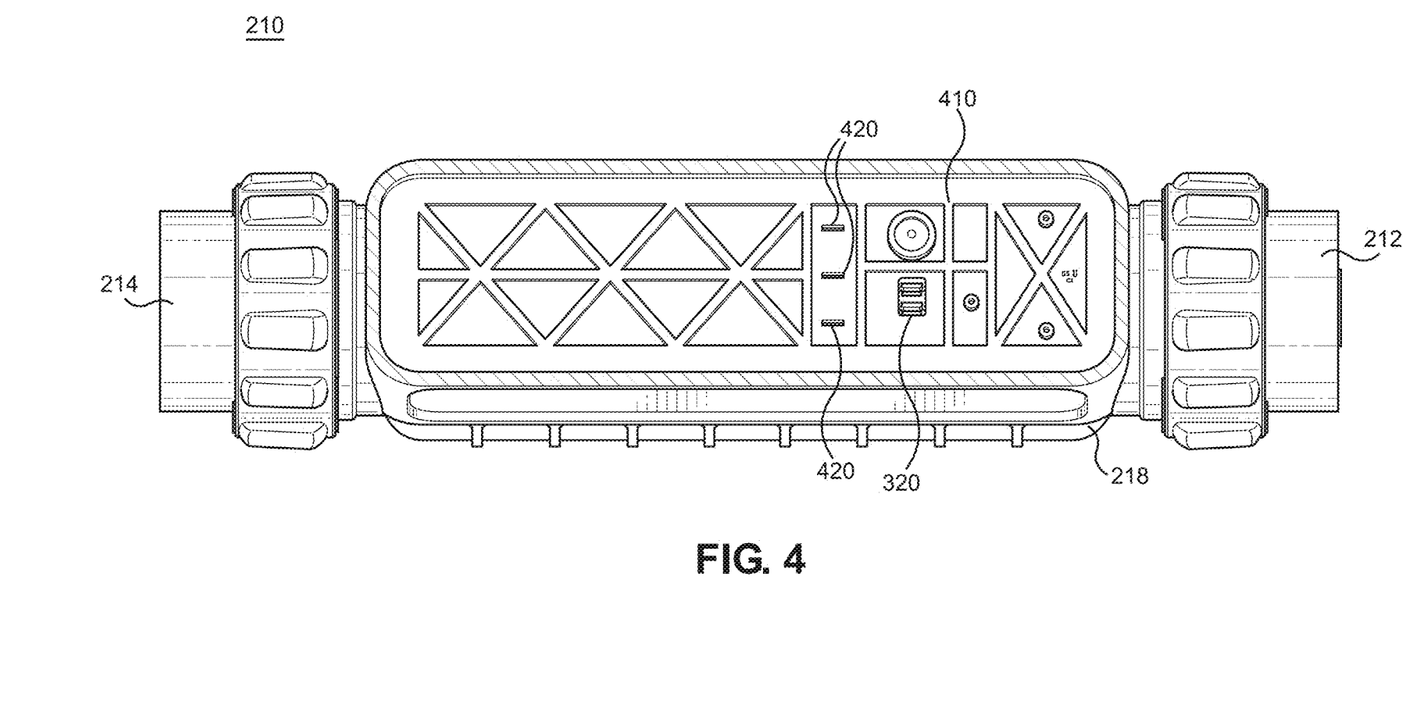
FIG. 4 is a perspective, cross-sectional view of the example chlorinator device of FIG. 2.

FIG. 4 illustrates a detailed cross-sectional view of the chlorinator device 210, which may be the same device shown in FIGS. 2 and 3. For example, the chlorinator device 210 shows the same housing 218 but at a different but parallel cross section, relative to FIG. 3.

Within the housing 218, a separation panel 410 is provided for mounting various components. The separation panel 410 can serve as a structural support and organizational element for the internal components of the chlorinator device 210. It can also delineate portions of the device 210 that have water flowing through, and portions that remain dry. The surface of the panel 410 shown in FIG. 4 is intended to remain dry, while the opposing surface is intended to contact water flowing through the device 210.

The salt sensor 320, previously described in relation to FIG. 3, is also visible in this cross-sectional view. The salt sensor 320 can be positioned to accurately measure the salinity or conductivity of the water flowing through the chlorinator device 210.

Connectors 420 that provide power to the electrolyte plates 330 may also be shown in this view. These connectors 420 can provide the necessary electrical power to the electrolyte plates 330 for the electrolysis process that converts salt in the water into chlorine. The connectors 420 can be designed to ensure configurable and efficient power transfer.

FIG. 4 does not depict a dedicated heat sink. Heat sinks, which are typically singular blocks of metal, are used in electronics applications where excessive heat is created. The heat sinks help dissipate the heat to the surrounding area. But regardless of that fact, electronics that produce excessive heat typically have shorter lifespans than similar electronics not subject to excessive heat. Heat sinks also add to the cost of manufacture. For these reasons, and to eliminate the need for a dedicated heat sink in this particular type of product and application, it is not considered desirable to have high heat-generating electronics onboard the chlorinator device 210 itself. When these types of electronics are mounted onboard a chlorinator device, they are difficult to access and service. This means that when they die, the whole chlorinator device must be replaced. The subject matter described herein aims to overcome these known issues by using an external controller, such as external controller 260, to house the high heat-generating electronics, such as the power supply for the electrolyte plates.

Figure 5:
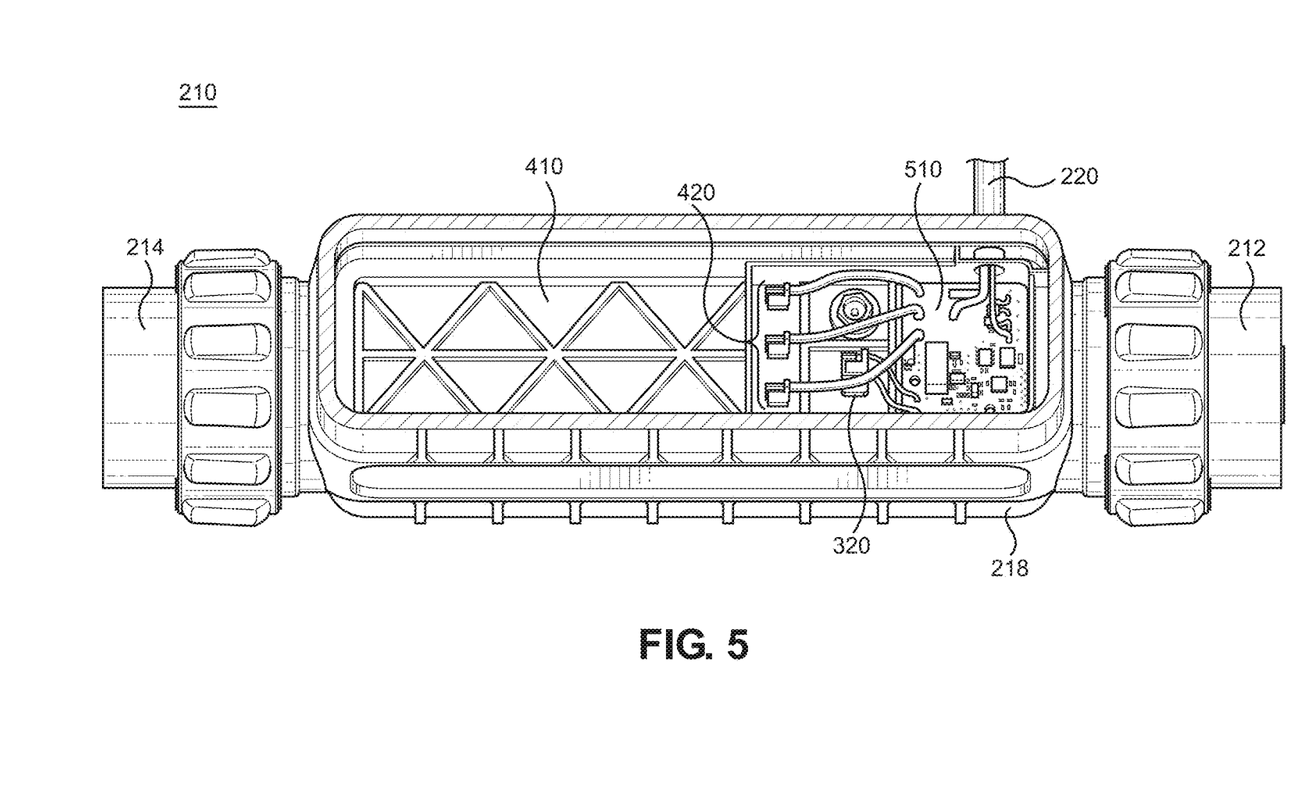
FIG. 5 is a perspective, cross-sectional view of the example chlorinator device of FIG. 2.

FIG. 5 illustrates a detailed cross-sectional view of the chlorinator device 210, which may be the same device shown in FIGS. 2-4. The cross section in this figure is moved up slightly compared to previous figures to show additional internal components.

Inside the housing 218, and mounted directly to the panel 410, a low-power onboard controller 510 is visible. This controller 510 can manage the internal operations of the chlorinator device 210, including processing sensor data and controlling the electrolyte plates 330. The low-power design of this onboard controller 510 allows it to operate without generating excessive heat, eliminating the need for a heat sink. Moreover, while the onboard controller can optionally route power from the external controller 260 to the plates 330, it does not function as a power supply. In some embodiments, the lines connecting to connectors 420 are routed around the external controller 260 rather than through it. In either configuration, the specific arrangement of components described herein with respect to the chlorination system 200 of FIGS. 2-5 allow for the onboard controller 510 to be mounted directly to the panel 410 without the use of a dedicated heat sink.

This configuration, with the low-power onboard controller 510 and the absence of high-heat generating components, allows for a simpler and more reliable design compared to devices with onboard high-power electronics. The external controller configuration separates the power supply, which generates substantial heat, from the chlorinator device 210 itself. This arrangement allows for modular replacement of different parts of the system and improves overall system longevity and serviceability.

Figure 6:
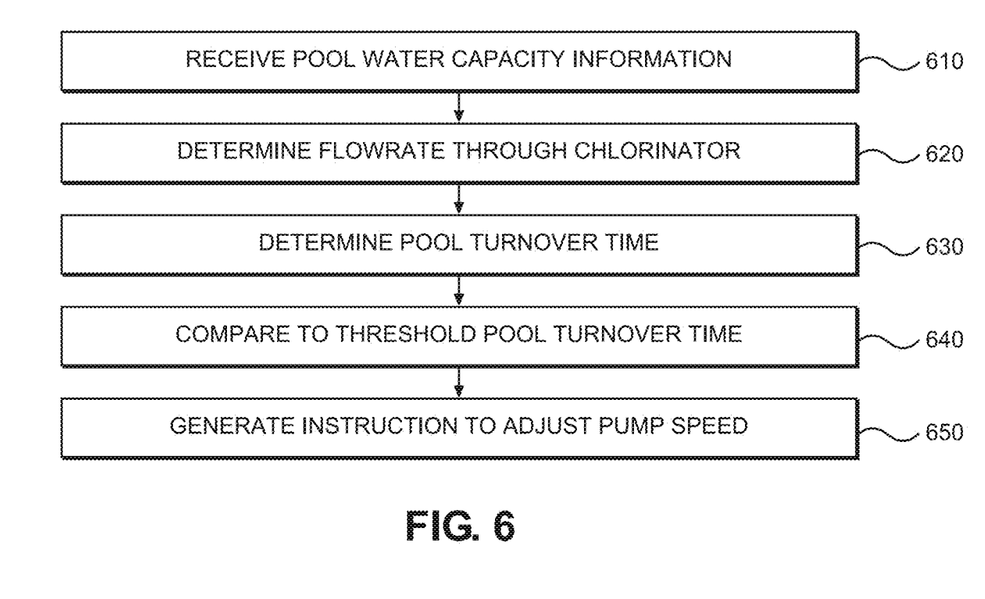
FIG. 6 is a flowchart of an example method in accordance with one or more embodiments herein.

FIG. 6 illustrates a flowchart of an example method for managing pool water turnover using a chlorinator device. The method can be implemented by the chlorinator systems described in previous figures, such as the system shown in FIG. 1 or FIGS. 2-5. Because the methods of FIGS. 6-9 could apply to any systems, devices, or methods specified by the claims, rather than being specific to the examples described previously, no element numbering is used.

Stage 610 can include receiving pool water capacity information. This information can be obtained through various means. In some examples, a user can input the pool volume directly into a mobile application connected to the chlorinator system. In other examples, the pool capacity can be retrieved from a cloud-based database that stores information about the pool installation.

Stage 620 can include determining the flowrate through the chlorinator. This determination can be made using the flowrate sensor described in earlier Figures, such as the flow sensor 122 shown in FIG. 1. The flowrate sensor can continuously monitor the water flow through the chlorinator device, providing real-time data. In some examples, the flowrate can be averaged over a specific time period to account for any short-term fluctuations.

Stage 630 can include determining the pool turnover time. This calculation can be performed by dividing the total pool water capacity (obtained in stage 610) by the current flowrate (determined in stage 620). The result gives an estimate of how long it takes for the entire volume of pool water to pass through the filtration and chlorination system. In some examples, this calculation can be performed continuously or at regular intervals to provide up-to-date information on pool turnover.

Stage 640 can include comparing the calculated pool turnover time to a threshold pool turnover time. The threshold time can be a predetermined value based on pool industry standards or user preferences. In some examples, the threshold time can be set to 24 hours, as many pool experts recommend turning over the entire pool volume at least once per day. The comparison can involve a simple numeric check to determine if the calculated turnover time exceeds the threshold.

Stage 650 can include generating an instruction to adjust pump speed based on the comparison made in stage 640. If the calculated turnover time exceeds the threshold, the system can generate an instruction to increase the pump speed, thereby increasing the flowrate and reducing the turnover time. Conversely, if the turnover time is significantly below the threshold, the system can generate an instruction to decrease the pump speed, potentially saving energy while still maintaining adequate water circulation. In some examples, these instructions can be sent directly to a variable speed pump connected to the chlorinator system. In other examples, the instructions can be displayed to a user via a mobile application or control panel, allowing manual adjustment of the pump settings.

The method illustrated in FIG. 6 can provide several advantages. By actively managing pool turnover time, the system can ensure proper water circulation and filtration, which can be crucial for maintaining water quality and chlorine distribution. Additionally, the ability to adjust pump speed based on actual turnover time can lead to more efficient energy use, potentially reducing operating costs for pool owners.

In some examples, the method can also incorporate additional factors into the decision-making process. For instance, the system can consider the time of day, expected pool usage patterns, or weather conditions when determining whether to adjust the pump speed. This can allow for more nuanced control of the pool circulation system, further optimizing both water quality and energy efficiency.

The method described in FIG. 6 can be implemented as part of a larger pool management system, working in conjunction with other features such as chlorine production control, water chemistry monitoring, and automated scheduling of pool equipment operation.

Figure 7:
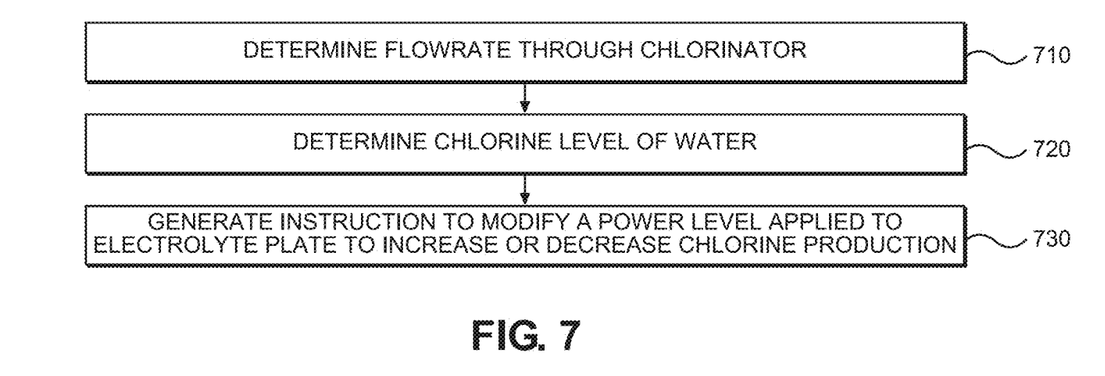
FIG. 7 is a flowchart of an example method in accordance with one or more embodiments herein.

FIG. 7 provides a flowchart of an example method for using flowrate to adjust the power level applied to chlorine-generating metal plates. Stage 710 can include determining a flowrate through the chlorinator. This determination can be made using the flowrate sensor described in earlier Figures, such as the flow sensor 122 shown in FIG. 1. The flowrate sensor can continuously monitor the water flow through the chlorinator device, providing real-time data. In some examples, the flowrate can be averaged over a specific time period to account for any short-term fluctuations.

Stage 720 can include determining a chlorine level of the water. This determination can be made using various methods. In some examples, a dedicated chlorine sensor may be included in the chlorinator device or elsewhere in the pool circulation system. Alternatively, the chlorine level can be estimated based on factors such as recent chlorine production rates, water temperature, and historical data on chlorine consumption patterns for the specific pool.

Stage 730 can include generating an instruction to modify a power level applied to the electrolyte plate to increase or decrease chlorine production. This instruction can be based on the flowrate determined in stage 710 and the chlorine level determined in stage 720. For example, if the chlorine level is below a desired threshold and the flowrate is sufficient, the system may generate an instruction to increase the power level applied to the electrolyte plate, thereby increasing chlorine production. Conversely, if the chlorine level is above the desired threshold or if the flowrate is low, the system may generate an instruction to decrease the power level, reducing chlorine production.

The method illustrated in FIG. 7 can provide several advantages. By dynamically adjusting chlorine production based on both flowrate and current chlorine levels, the system can maintain optimal water chemistry while potentially reducing energy consumption and extending the life of the electrolyte plates. This method can also help prevent over-chlorination, which can be harmful to swimmers and pool equipment.

In some examples, the method can incorporate additional factors into the decision-making process for adjusting chlorine production. These factors can include water temperature, pH levels, anticipated pool usage patterns, and weather forecasts. For instance, the system may increase chlorine production in anticipation of higher pool usage during hot weather or decrease production during periods of expected low usage.

The method described in FIG. 7 can be implemented as part of a larger pool management system, working in conjunction with other features such as automated pH control, pool pump speed adjustment, and user notification systems.

Figure 8:
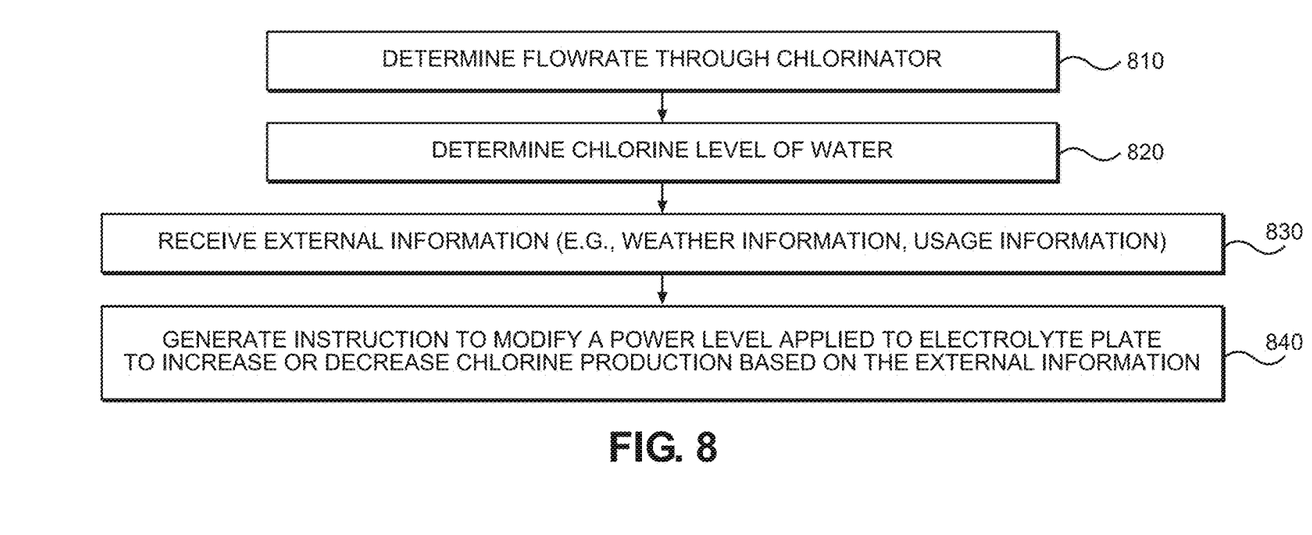
FIG. 8 is a flowchart of an example method in accordance with one or more embodiments herein.

FIG. 8 includes a flowchart illustrating an example method for managing chlorine production in a pool system based on external information. Stage 810 of the example method can include determining a flowrate through the chlorinator. This determination can be made using the flowrate sensor described in earlier figures, such as the flow sensor 122 shown in FIG. 1. The flowrate sensor can continuously monitor the water flow through the chlorinator device, providing real-time data. In some examples, the flowrate can be averaged over a specific time period to account for any short-term fluctuations.

Stage 820 can include determining a chlorine level of the water. This determination can be made using various methods. In some examples, a dedicated chlorine sensor may be included in the chlorinator device or elsewhere in the pool circulation system. Alternatively, the chlorine level can be estimated based on factors such as recent chlorine production rates, water temperature, and historical data on chlorine consumption patterns for the specific pool.

Stage 830 can include receiving external information. This external information can encompass a wide range of data that may impact chlorine demand or pool usage. For example, weather information can be received from a weather API, as described in relation to FIG. 1. This can include current temperature, forecasted temperature, precipitation probability, and UV index. Usage information can be received from a user's calendar or from historical usage patterns stored in the system. For instance, the system may receive information about an upcoming pool party or regular swim team practice sessions.

Stage 840 can include generating an instruction to modify a power level applied to the electrolyte plate (which can be multiple plates) to increase or decrease chlorine production based on the external information. This stage integrates the information gathered in the previous stages to make an informed decision about chlorine production. For example, if the weather forecast indicates an upcoming heatwave and the user's calendar shows increased pool usage, the system may generate an instruction to increase the power level to the electrolyte plate, thereby increasing chlorine production in anticipation of higher demand. Conversely, if cool, rainy weather is forecasted and no pool usage is scheduled, the system may generate an instruction to decrease the power level, reducing chlorine production to conserve energy and resources.

In some examples, the method illustrated in FIG. 8 can provide several advantages. By incorporating external information into the decision-making process, the system can proactively adjust chlorine production to match anticipated demand. This can help maintain optimal water chemistry while potentially reducing energy consumption and extending the life of the electrolyte plates. The method can also enhance user experience by ensuring the pool is always ready for use, regardless of weather conditions or usage patterns.

The method described in FIG. 8 can be implemented as part of a larger pool management system, working in conjunction with other features such as automated pH control, pool pump speed adjustment, and user notification systems. It can be executed continuously or at regular intervals to ensure the pool system is always operating at optimal efficiency based on the most current information available.

Figure 9:
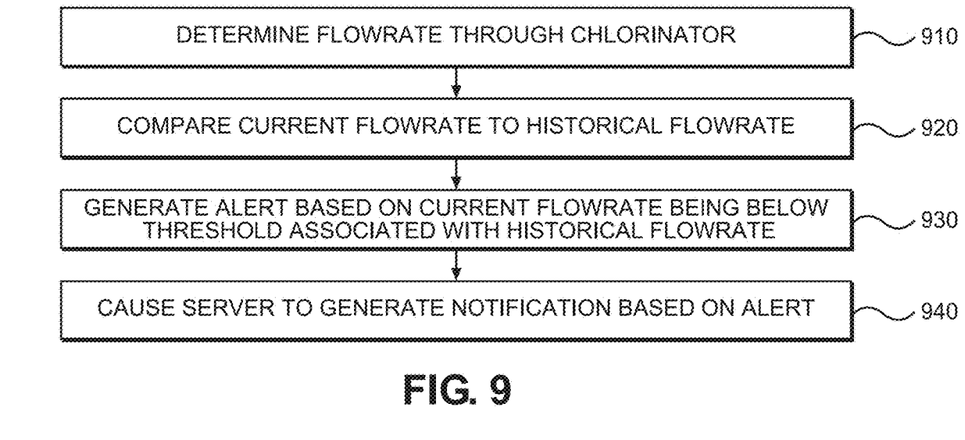
FIG. 9 is a flowchart of an example method in accordance with one or more embodiments herein.

FIG. 9 provides a flowchart of an example method for detecting potential issues with a pool filtration system using flowrate data from a chlorinator device. Stage 910 of the example method includes determining a flowrate through the chlorinator. This determination can be made using the flowrate sensor described in earlier figures, such as the flow sensor 122 shown in FIG. 1. The flowrate sensor can continuously monitor the water flow through the chlorinator device, providing real-time data. In some examples, the flowrate can be averaged over a specific time period to account for any short-term fluctuations.

Stage 920 can include comparing the current flowrate to historical flowrate data. This comparison can help identify potential issues with the pool's filtration system. Historical flowrate data can be stored in the system's memory or in a cloud-based database. The historical data can include average flowrates for different times of day, different seasons, or under various operating conditions. In some examples, the system can use machine learning algorithms to establish baseline flowrate patterns for the specific pool system.

Stage 930 of the example method includes generating an alert based on the current flowrate being below a threshold associated with the historical flowrate. This threshold can be a predetermined percentage of the historical average flowrate, or it can be dynamically adjusted based on various factors such as time of day, season, or recent pool usage patterns. For example, if the current flowrate is 20% lower than the historical average for similar conditions, an alert may be generated. In some examples, the system can use multiple thresholds to indicate different levels of concern, such as a "warning" level and a more serious "alert" level.

Stage 940 can include causing a server to generate a notification based on the alert. This notification can take various forms depending on the severity of the issue and user preferences. In some examples, the notification can be a push notification sent to a user's mobile device through a dedicated pool management application. In other examples, the notification can be an email or text message sent to the pool owner or maintenance personnel. The notification can include details about the detected issue, such as the current flowrate, the historical average, and the percentage decrease. It can also provide recommendations for troubleshooting or maintenance actions.

In some examples, the method illustrated in FIG. 9 can provide several advantages. By continuously monitoring flowrate and comparing it to historical data, the system can detect potential issues with the pool's filtration system before they become serious problems. This can help prevent equipment damage, maintain water quality, and potentially reduce energy costs by identifying inefficiencies early. The automated alert and notification system can ensure that pool owners or maintenance personnel are promptly informed of any issues, allowing for timely intervention.

The method described in FIG. 9 can be implemented as part of a larger pool management system, working in conjunction with other features such as chlorine production control, water chemistry monitoring, and automated scheduling of pool equipment operation. By integrating flowrate monitoring with these other functions, the system can provide a comprehensive approach to pool maintenance and optimization.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A chlorinator device for generating chlorine in a body of water, comprising:
a housing having an inlet end and an outlet end, wherein the inlet and outlet ends are in communication with the body of water, and wherein the inlet and outlet ends are positioned such that water flows through the chlorinator device along a flow axis extending through centers of the inlet and outlet ends;
at least one flowrate sensor mounted within the housing and positioned to measure a flowrate of water through the housing and generate information sufficient to derive a current flowrate through the chlorinator device, wherein:
the at least one flowrate sensor includes a turbine that rotates based on water flowing along the flow axis,
the turbine of the at least one flowrate sensor is configured to rotate about the flow axis, and
the flowrate sensor is retained in the chlorinator device by a fitting configured to also couple the inlet end of the chlorinator device to an inlet pipe that is separate from the chlorinator device and provides fluid communication between the chlorinator device and the body of water; and
at least one electrolyte plate mounted within the housing and positioned to contact water flowing through the housing, wherein the at least one electrolyte plate is configured to be electrified such that it converts salt within the water into chlorine.

2. The chlorinator device of claim 1, wherein the at least one flowrate sensor includes at least one Hall-effect sensor configured to determine a rotational speed of the turbine.

3. The chlorinator device of claim 1, further comprising an external controller coupled to the housing via only a cable that includes an electrical connection and is configured to communicate with the at least one flowrate sensor.

4. The chlorinator device of claim 3, wherein the external controller receives flowrate information generated by the at least one flowrate sensor.

5. The chlorinator device of claim 1, wherein the chlorinator device is configured to calculate pool turnover based on tracking flowrate through the chlorinator device for a period of time, calculating a volume of water based on flowrate information for the period of time, and comparing the calculated volume to a known volume of the body of water.

6. The chlorinator device of claim 1, wherein the chlorinator device is configured to receive weather information and generate instructions based on the weather information.

7. The chlorinator device of claim 6, wherein the chlorinator device is further configured to transmit the generated instructions to at least one different device in communication with the body of water.

8. The chlorinator device of claim 1, wherein the chlorinator device is configured to connect to a wireless network and upload information to a cloud storage location.

9. The chlorinator device of claim 1, wherein, based on flowrate information from the at least one flowrate sensor, the chlorinator device is configured to detect a change in performance in a filtration system of the body of water.

10. The chlorinator device of claim 9, wherein the chlorinator device is configured to detect that the filtration system is blocked.

11. The chlorinator device of claim 9, wherein the chlorinator device is configured to generate an alert based on detecting the change in performance in the filtration system.

12. A method for generating chlorine in a body of water, the method comprising:
providing a chlorine generator comprising:
a housing having an inlet end and an outlet end in communication with the body of water, wherein the inlet and outlet ends are positioned such that water flows through the chlorinator device along a flow axis extending through centers of the inlet and outlet ends;
at least one flowrate sensor mounted within the housing and positioned to measure a flowrate of water through the housing and generate information sufficient to derive a current flowrate through the chlorinator device, wherein:
the at least one flowrate sensor includes a turbine that rotates based on water flowing along the flow axis,
the turbine of the at least one flowrate sensor is configured to rotate about the flow axis, and
the flowrate sensor is retained in the chlorinator device by a fitting configured to also couple the inlet end of the chlorinator device to an inlet pipe that is separate from the chlorinator device and provides fluid communication between the chlorinator device and the body of water; and
at least one electrolyte plate mounted within the housing and positioned to contact water flowing through the housing, wherein the at least one electrolyte plate is electrified such that it converts salt within the water into chlorine; and
converting salt within the water into chlorine.

13. The method of claim 12, wherein the at least one flowrate sensor includes at least one Hall-effect sensor configured to determine a rotational speed of the turbine.

14. The method of claim 12, wherein the chlorine generator further comprises an external controller coupled to the housing via only a cable that includes an electrical connection and is configured to communicate with the at least one flowrate sensor.

15. The method of claim 14, further comprising receiving flowrate information generated by the at least one flowrate sensor.

16. The method of claim 12, further comprising calculating pool turnover based on tracking flowrate through the chlorinator device for a period of time, calculating a volume of water based on flowrate information for the period of time, and comparing the calculated volume to a known volume of the body of water.

17. The method of claim 12, further comprising receiving weather information and generating instructions based on the weather information.

18. The method of claim 12, further comprising transmitting the generated instructions to at least one different device in communication with the body of water.

19. The method of claim 12, wherein, based on flowrate information from the at least one flowrate sensor, the chlorinator device is configured to detect a change in performance in a filtration system of the body of water.

20. The method of claim 19, further comprising detecting that the filtration system is blocked and generating an alert.

* * * * *